(12) United States Patent
Li

(10) Patent No.: US 10,846,073 B2
(45) Date of Patent: Nov. 24, 2020

(54) METHODS, APPARATUSES, TERMINALS, SERVERS, AND SYSTEMS FOR CONTAINER GENERATION

(71) Applicant: ALIBABA GROUP HOLDING LIMITED, Grand Cayman (KY)

(72) Inventor: Zhiyun Li, Hangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 0 days.

(21) Appl. No.: 16/289,562

(22) Filed: Feb. 28, 2019

(65) Prior Publication Data

US 2019/0196804 A1 Jun. 27, 2019

Related U.S. Application Data

(63) Continuation of application No. PCT/CN2017/097628, filed on Aug. 16, 2017.

(30) Foreign Application Priority Data

Aug. 29, 2016 (CN) .......................... 2016 1 0757354

(51) Int. Cl.
*G06F 9/455* (2018.01)
*H04L 29/06* (2006.01)
(Continued)

(52) U.S. Cl.
CPC .................. *G06F 8/63* (2013.01); *G06F 8/62* (2013.01); *G06F 8/654* (2018.02); *G06F 9/455* (2013.01); *G06F 9/45558* (2013.01); *G06F 8/61* (2013.01)

(58) Field of Classification Search
CPC ...... G06F 21/575; G06F 21/572; G06F 21/57; G06F 21/6281; G06F 8/61; G06F 8/65;
(Continued)

(56) References Cited

U.S. PATENT DOCUMENTS 7,925,749 B1 4/2011 Lin et al.
9,448,783 B2* 9/2016 Le ........................ G06F 9/45558
(Continued)

FOREIGN PATENT DOCUMENTS

CN 105069353 A 11/2015
CN 105099706 A 11/2015
(Continued)

OTHER PUBLICATIONS

Yan et al., A Virtual Time System for Linux-container-based Emulation of Software-defined Networks, 12 pages (Year: 2015).*
(Continued)

*Primary Examiner* — Thuy Dao
(74) *Attorney, Agent, or Firm* — Finnegan, Henderson, Farabow, Garrett & Dunner, LLP

(57) ABSTRACT

The present disclosure provides methods, apparatuses, terminals, servers, and systems for container generation. One exemplary method for container generation includes: generating a first container according to an image, in which the image and the first container both include a service firmware; and acquiring a software package of a first service variable program from a server, and installing the first service variable program into the first container according to the software package, in which the first service variable program provides an application service for a user based on the service firmware.

20 Claims, 6 Drawing Sheets

(51) Int. Cl.
*G06F 9/44* (2018.01)
*G06F 9/445* (2018.01)
*H04L 29/08* (2006.01)
*G06F 8/61* (2018.01)
*G06F 8/654* (2018.01)

(58) Field of Classification Search
CPC .. G06F 9/44505; G06F 9/4416; G06F 9/4401; G06F 9/4411; G06F 9/45558; G06F 9/5077; G06F 2009/45595; G06F 2009/4557; G06F 21/53; G06F 8/63; G06F 8/654; G06F 8/62; G06F 9/455; H04L 67/34

See application file for complete search history.

(56) References Cited

U.S. PATENT DOCUMENTS

| | | | | |
|---|---|---|---|---|
| 9,575,797 | B2* | 2/2017 | Linton | G06F 9/45558 |
| 9,606,822 | B2* | 3/2017 | Hunt | G06F 9/45558 |
| 9,922,192 | B1* | 3/2018 | Kashyap | G06F 9/45558 |
| 2014/0101654 | A1* | 4/2014 | Chang | H04L 67/34 717/174 |
| 2014/0330787 | A1 | 11/2014 | Modukuri et al. | |
| 2015/0301821 | A1* | 10/2015 | Danne | H04L 67/06 717/169 |
| 2016/0246510 | A1* | 8/2016 | Rothman | G06F 9/44505 |
| 2016/0350098 | A1* | 12/2016 | Kuchibhotla | G06F 8/65 |
| 2017/0308705 | A1* | 10/2017 | Karaginides | G06F 21/575 |

FOREIGN PATENT DOCUMENTS

| | | |
|---|---|---|
| CN | 105763602 A | 7/2016 |
| WO | WO 2018/040914 A1 | 8/2018 |

OTHER PUBLICATIONS

PCT International Search Report issued in International Application No. PCT/CN2017/097628, dated Nov. 17, 2017 (6 pages).

* cited by examiner

METHODS, APPARATUSES, TERMINALS, SERVERS, AND SYSTEMS FOR CONTAINER GENERATION

CROSS-REFERENCE TO RELATED APPLICATIONS

The present application claims priority to International Application No. PCT/CN2017/097628, filed Aug. 16, 2017, which claims priority to and the benefits of Chinese Patent Application Serial No. 201610757354.X, filed on Aug. 29, 2016, entitled "CONTAINER GENERATION METHOD, DEVICE, TERMINAL, SERVER AND SYSTEM", both of which are incorporated herein by reference in their entireties.

TECHNICAL FIELD

The present disclosure relates to server technologies, and in particular, to methods, apparatuses, terminals, servers, and systems for container generation.

BACKGROUND

"Docker" is an open source application container engine, which can provide an automatic application deployment solution. Specifically, a container can be rapidly created by using an image. The container, as a lightweight virtual machine, deploys and runs a basic service variable program. Automatic installation, deployment, and upgrading of the basic service variable program can be implemented easily through a configuration file. Multiple containers are created in a "Docker." The containers are isolated from each other and have no interface, thus separating their production environments and development environments and avoiding mutual interference.

In conventional systems, an image used for creating a container is a complete basic operating system environment, and includes a basic service firmware and a basic service variable program. The basic service firmware provides many services, including, for example, communication management for communication between different applications, identity authentication, authorized security services, error management, and so on. The basic service variable program relies on the basic service firmware to provide services for the user. For example, the basic service variable program calls the basic service firmware to provide services (e.g., some applications) for the user. After a container is created according to the image, the container also includes the basic service firmware and the basic service variable program. Because the basic service variable program relies on the basic service firmware, the image needs to create some information to maintain the relationship between the basic service variable program and the basic service firmware. For example, after the basic service variable program is set in the image, the image not only includes the basic service variable program, but also needs to record location information of the basic service variable program. As a result, when the container is created by using the image, the location information also exists in the container, occupying the space of the container and affecting the container creation speed.

SUMMARY

Embodiments of the present disclosure provide methods, apparatuses, terminals, servers, and systems for container generation, to solve the problem of container creation speed in conventional systems.

According to some embodiments of the present disclosure, systems for container generation are provided. One exemplary system for container generation includes a server configured to store a software package of a first service variable program, and a terminal configured to generate a first container according to an image, acquire the software package from the server, and install the first service variable program into the first container according to the software package. The image and the first container both include a service firmware. The first service variable program is configured to provide an application service for a user based on the service firmware.

According to some embodiments of the present disclosure, methods for container generation are provided. One exemplary method for container generation includes: generating a first container according to an image, in which the image and the first container both include a service firmware; and acquiring a software package of a first service variable program from a server, and installing the first service variable program into the first container according to the software package, in which the first service variable program is configured to provide an application service for a user based on the service firmware.

Another exemplary method for container generation includes: receiving a first request for acquiring a software package of a first service variable program from a first container; and sending information of the software package to the first container according to the first request, so that the first container acquires the software package according to the information of the software package, and installs the first service variable program into the first container, in which the first service variable program provides an application service for a user based on a service firmware, and the service firmware is generated when the first container is generated according to the image.

According to some embodiments of the present disclosure, apparatuses for container generation are provided. One exemplary apparatus for container generation includes a generation module, a first acquiring module, and a first installation module. The generation module is configured to generate a first container according to an image. The image and the first container both include a service firmware. The first acquiring module is configured to acquire a software package of a first service variable program from a server. The first service variable program is configured to provide an application service for a user based on the service firmware. The first installation module is configured to install the first service variable program into the first container according to the software package.

Another exemplary apparatus for container generation includes a processor and a first input device. The processor is configured to generate a first container according to an image. The image and the first container both include a service firmware. The first input device is configured to acquire a software package of a first service variable program from a server. The first service variable program is configured to provide an application service for a user based on the service firmware. The processor is further configured to install the first service variable program into the first container according to the software package.

According to some embodiments of the present disclosure, terminals are provided. One exemplary terminal includes any one of the apparatuses for container generation mentioned above.

Still another exemplary apparatus for container generation includes a first receiving module and a first sending module. The first receiving module is configured to receive a first request for acquiring a software package of a first service variable program sent by a first container. The first sending module is configured to send information of the software package to the first container according to the first request, so that the first container acquires the software package according to the information of the software package and installs the first service variable program into the first container. The first service variable program is configured to provide an application service for a user based on a service firmware. The service firmware is generated when the first container is generated according to an image.

Still another exemplary apparatus for container generation includes a second input device and an output device. The second input device is configured to receive a first request for acquiring a software package of a first service variable program from a first container. The output device is configured to send information of the software package to the first container according to the first request, so that the first container acquires the software package according to the information about the software package and installs the first service variable program into the first container. The first service variable program is configured to provide an application service for a user based on a service firmware. The service firmware is generated when the first container is generated according to an image.

According to some embodiments of the present disclosure, servers are provided. One exemplary server includes any one of the apparatuses for container generation mentioned above.

According to some embodiments of the present disclosure, systems for container generation are provided. One exemplary system includes the terminal mentioned above, the server mentioned above, and an image.

According to some embodiments of the present disclosure, non-transitory computer-readable mediums are provided. One exemplary non-transitory computer-readable medium stores a set of instructions that is executable by at least one processor of an apparatus to cause the apparatus to perform a method for container generation, the method including: generating a first container according to an image, in which the image and the first container both include a service firmware; and acquiring a software package of a first service variable program from a server, and installing the first service variable program into the first container according to the software package, in which the first service variable program is configured to provide an application service for a user based on the service firmware.

BRIEF DESCRIPTION OF THE DRAWINGS

To describe the technical solutions in the embodiments of the present disclosure or the prior art more clearly, the drawings that need to be used in the embodiments or the prior art are briefly introduced. It would be obvious that the drawings in the following description are merely some embodiments of the present disclosure, and those of ordinary skilled in the art may further obtain other drawings according to these drawings without creative efforts.

DETAILED DESCRIPTION

Figure 1:
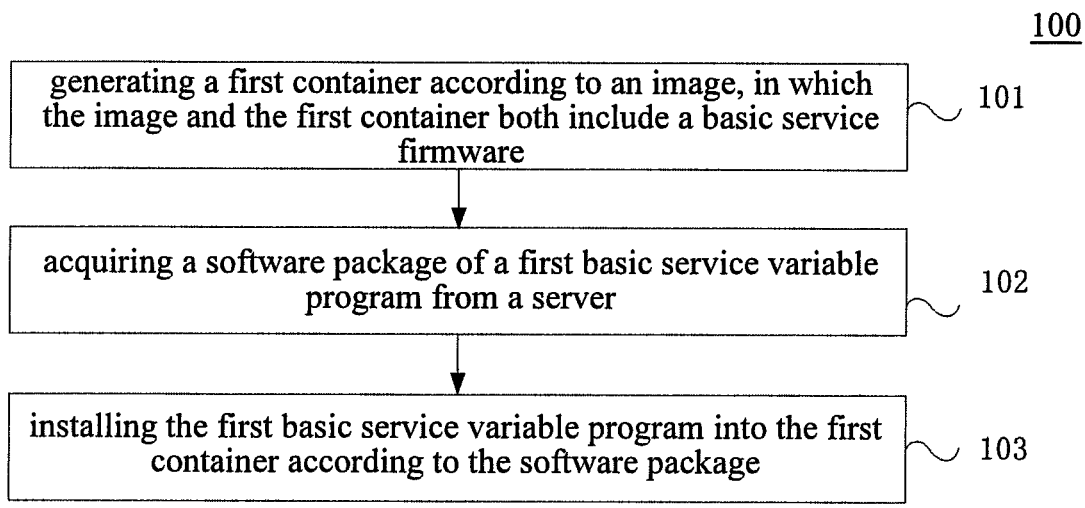
FIG. 1 is a schematic flowchart of an exemplary method for container generation according to some embodiments of the present disclosure.

It is to be understood that both the foregoing general description and the following detailed description are examples and explanatory only and are not restrictive of the disclosed embodiments as claimed. The accompanying drawings constitute a part of this specification. The drawings illustrate several embodiments of the present disclosure and, together with the description, serve to explain the principles of the disclosed embodiments as set forth in the accompanying claims. Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

In some embodiments of the present disclosure, a basic service firmware and a basic service variable program are separated. That is, the basic service firmware is set in an image, which refers to a complete operating system environment that can include the basic service firmware. The basic service firmware provides many services, including, for example, communication management for communication between different applications, identity authentication, authorized security services, error management, and so on. By setting the basic service firmware in the image, the basic service firmware is also generated in a first container when the first container is created. The container can be a lightweight virtual machine that deploys and executes the basic service variable program and is created by using the image.

Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced.

Exemplary embodiments will be described in detail herein with reference to examples shown in the accompanying drawings. When the following description is made with reference to the accompanying drawings, unless otherwise indicated, same or similar reference numbers in different drawings represent same or similar elements. Implementations described in the following exemplary embodiments do not represent all implementations consistent with the present disclosure. On the contrary, they are merely examples of apparatuses and methods as detailed in the appended claims and consistent with some aspects of the present disclosure.

First, a system for container generation of some embodiments in the present disclosure is introduced.

Figure 11:
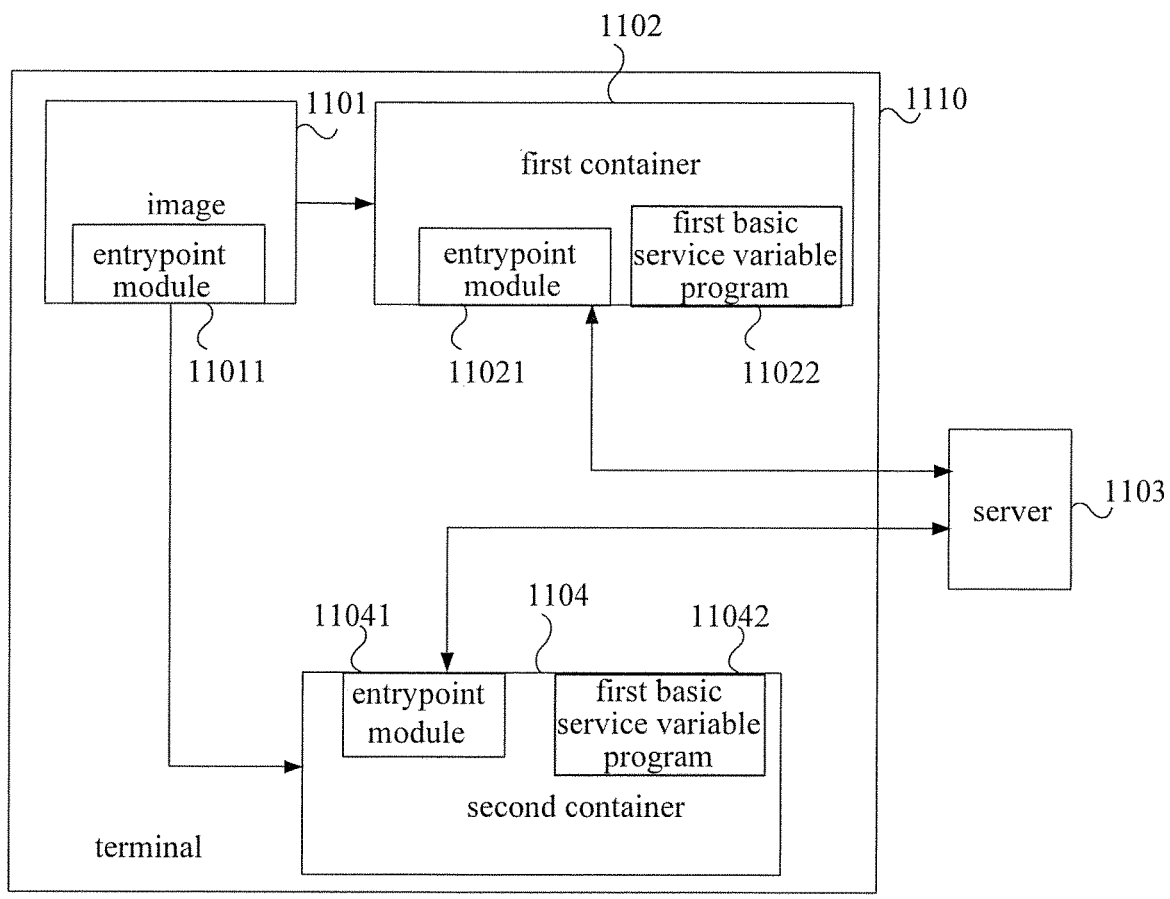
FIG. 11 is a schematic structural diagram of an exemplary system for container generation according to some embodiments of the present disclosure.

FIG. 11 is a schematic structural diagram of a system 1100 for container generation according to some embodiments. The system 1100 includes a server 1103 and a terminal 1110. The server 1103 stores a software package of a first basic service variable program 11022. The terminal 1110 is configured to generate a first container 1102 according to an image 1101, to acquire the software package from the server 1103, and to install the first basic service variable program 11022 into the first container 1102 according to the software package. The image 1101 and the first container 1102 both include a basic service firmware. The first basic service variable program 11022 is configured to provide an application service for a user based on the basic service firmware.

The basic service firmware is a program related to an application runtime environment, including, for example, communication management for communication between different applications, identity authentication, authorized security services, error management, and so on. The basic service variable program relies on the basic service firmware to provide services for the user. For example, the basic service variable program calls the basic service firmware to provide services, e.g., some applications, for the user. The basic service variable program can be upgraded in the server, to achieve functional optimization.

The terminal 1110 may be various terminal devices, such as a mobile phone, a computer, and a palmtop computer, and is not limited specifically herein.

Those skilled in the art can understand the specific detailed operations of the terminal 1110 generating the first container 1102 according to the image 1101, and thus further explanation is omitted herein for the sake of brevity.

After generating the first container 1102, the terminal 1110 may specifically send, to the server 1103, a first request for downloading the software package of the first basic service variable program 11022. After receiving, from the terminal 1110, the first request for downloading the software package of the first basic service variable program, the server 1103 returns the software package to the terminal 1110 according to the first request, so that the terminal 1110 can receive the software package returned by the server 1103. Alternatively, the terminal 1110 sends, to the server 1103, a second request for downloading the software package of the first basic service variable program 11022. After receiving, from the terminal 1110, the second request for downloading the software package of the first basic service variable program, the server 1103 returns second address information of the software package according to the second request. Thus, the terminal 1110 can receive the second address information of the software package returned by the server 1103 according to the second request, and acquire the software package according to the second address information.

After acquiring the software package, the terminal 1110 can perform an installation operation, so that the first container 1102 includes the first basic service variable program 11022, and is capable of providing a corresponding service for the user.

Optionally, the terminal 1110 of some embodiments is further configured to acquire an upgrade package of the first basic service variable program 11022 from the server 1103, and upgrade the first basic service variable program 11022 according to the upgrade package.

The upgrade package can replace the software package of the first basic service variable program in the server 1103. In this way, the terminal 1110 can acquire the upgrade package from the server 1103 and upgrade the first basic service variable program 11022 according to the upgrade package, thus achieving functional optimization.

The server 1103 can be specifically configured to send first address information of the upgrade package of the first basic service variable program to the terminal 1110. Correspondingly, the terminal 1110 is specifically configured to receive the first address information sent by the server 1103, and acquire the upgrade package according to the first address information.

In some other embodiments, the server 1103 is specifically configured to receive, from the terminal 1110, an acquiring request for downloading the upgrade package of the first basic service variable program. In addition, the server 1103 is configured to return the first address information of the upgrade package to the terminal 1110 according to the acquiring request. Correspondingly, the terminal 1110 is specifically configured to send, to the server 1103, the acquiring request for downloading the upgrade package of the first basic service variable program. Then, the terminal 1110 is also configured to receive the first address information of the upgrade package returned by the server 1103 and acquire the upgrade package according to the first address information.

In the above two manners of acquiring the upgrade package, the terminal 1110 acquires the first address information of the upgrade package, and then acquires the upgrade package according to the first address information.

The server 1103 can also directly send the upgrade package to the terminal 1110. In this way, the terminal 1110 directly receives the upgrade package of the first basic service variable program sent by the server 1103. Alternatively, in some embodiments, the server 1103 is specifically configured to receive, from the terminal 1110, the acquiring request for downloading the upgrade package of the first basic service variable program, and return the upgrade package to the terminal according to the acquiring request. Correspondingly, the terminal 1110 is specifically configured to, send to the server 1103, the acquiring request for downloading the upgrade package of the first basic service variable program, and receive the upgrade package returned by the server 1103 according to the acquiring request.

In this way, the terminal 1110 can directly install the upgrade package after receiving the upgrade package.

In some embodiments of the present disclosure, the basic service firmware and the basic service variable program are separated. That is to say, the basic service firmware is set in the image, so that the basic service firmware is also generated in the first container when the first container is created. Then, the software package of the basic service variable program is acquired from the server and installed. In this way, in some embodiments, the image does not have to include maintenance information required for maintaining the basic service firmware and the basic service variable program. Therefore, the first container capable of providing the application service can be generated very rapidly, and the maintenance information will not occupy the space of the first container. Moreover, the apparatus can select, for the first container, the basic service variable program to be downloaded. Thus, the first container can be customized according to actual requirements, which further reduces the time required for generating the first container having the basic service variable program.

FIG. 1 is a schematic flowchart of an exemplary method 100 for container generation according to some embodiments. The embodiments in FIG. 1 provide the method 100 for container generation, which is executed by an apparatus for container generation. The apparatus can be disposed in a terminal (e.g., the terminal 1110 in FIG. 11).

As shown in FIG. 1, the method 100 for container generation includes steps 101, 102, and 103. In step 101, the apparatus generates a first container according to an image, where the image and the first container both include a basic service firmware. The image in the present embodiments includes the basic service firmware. Therefore, the first container created by using the image also includes a basic service firmware. Those skilled in the art can understand how to specifically generate the first container by using the image, and thus further explanation is omitted herein for the sake of brevity.

In step 102, the apparatus acquires a software package of a first basic service variable program from a server. In some embodiments, the first basic service variable program provides an application service for a user based on the basic service firmware. That is, the first basic service variable program is run in an environment of the basic service firmware to provide the application service for the user.

Step 102 can specifically include sending, to the server, the first request for downloading the software package of the first basic service variable program, and receiving the software package returned by the server according to the first request. That is, in some embodiments, after the apparatus sends the first request to the server, the server learns, according to the first request, that the software package of the first basic service variable program needs to be sent. Then, the server sends the software package to the apparatus.

Alternatively, step 102 can specifically include sending, to the server, the second request for downloading the software package of the first basic service variable program, receiving second address information of the software package returned by the server according to the second request, and acquiring the software package according to the second address information. When receiving the second request, the server learns that the apparatus may need to acquire the software package of the first basic service variable program and then sends the second address information of the software package to the apparatus. The apparatus downloads the software package according to the second address information.

It should be noted that, the apparatus can perform step 102 after receiving a trigger instruction sent by the user. For example, the user can select the first basic service variable program to be acquired. Alternatively, an instruction sent by the user to trigger step 101 can carry identification information of the first basic service variable program. The apparatus can acquire the software package of the first basic service variable program from the server according to the identification information. Furthermore, the apparatus can also actively perform step 102, so as to download the software package of the first basic service variable program as soon as possible.

In step 103, the apparatus installs the first basic service variable program into the first container according to the software package. After the software package is installed into the first container, the first container can provide a service function of the first basic service variable program for the user.

Optionally, the image and the first container both further include an acquisition application. The acquisition application is configured to perform data transmission with the server. That is, the operation of step 102 can be implemented by the acquisition application. The acquisition application can further include an entry point of the first basic service variable program, where the first basic service variable program begins to run.

Optionally, the image and the first container both further include address information of the server to perform data transmission with the server according to the address information of the server. That is, the address information of the server is preset in the image. After the terminal generates the first container according to the image, the first container also stores the address information of the server. Correspondingly, the acquisition application can find the server according to the address information of the server, and then perform data transmission with the server.

According to the present embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced.

Figure 2:
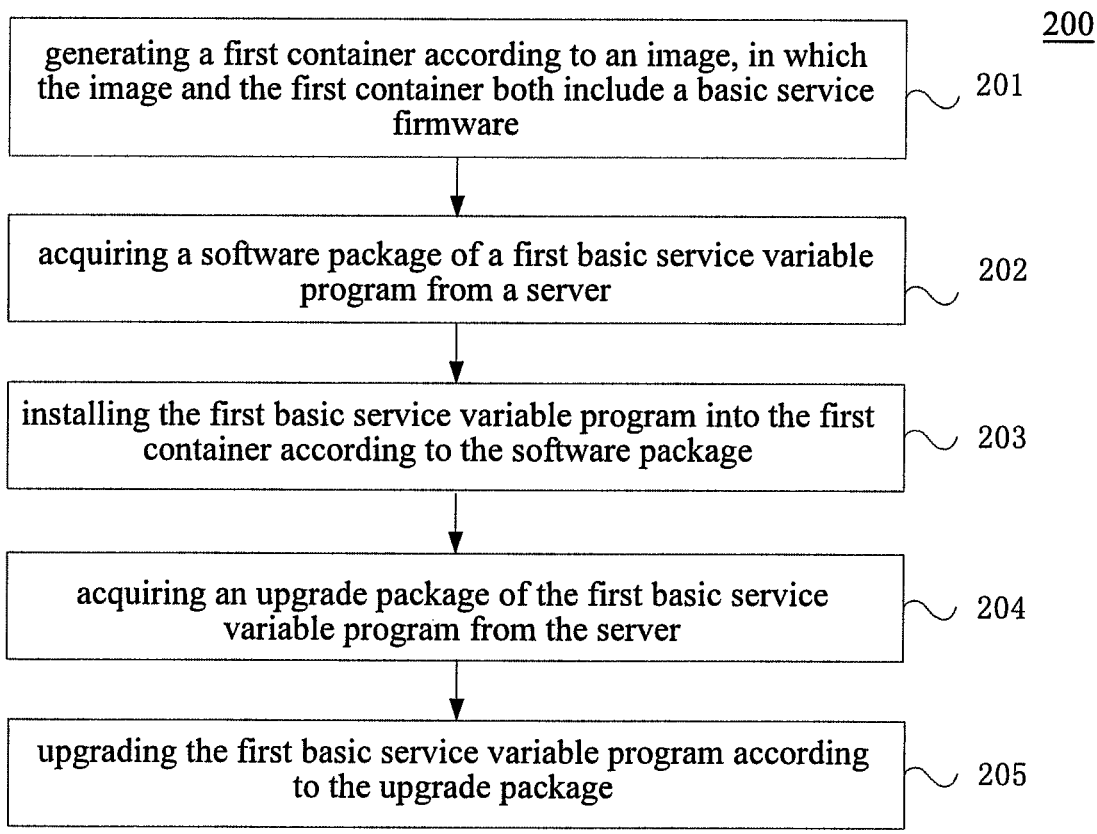
FIG. 2 is a schematic flowchart of an exemplary method for container generation according to some other embodiments of the present disclosure.

FIG. 2 is a schematic flowchart of a method 200 for generating a first container according to some embodiments. The embodiments shown in FIG. 2 further describe the method 200 for generating a first container described in the embodiments shown in FIG. 1. In the embodiments shown in FIG. 2, a method for upgrading the basic service variable program in the first container is mainly described.

In some embodiments, the method 200 for generating a first container includes steps 201, 202, 203, 204, and 205. In step 201, the apparatus generates a first container according to an image. The image and the first container both include a basic service firmware. The image of the embodiments includes the basic service firmware. Therefore, the first container created by using the image also includes a basic service. It is understood how to specifically generate the first container by using the image, and thus further explanation is omitted herein for the sake of brevity.

In step 202, the apparatus acquires a software package of a first basic service variable program from a server. In some embodiments, the first basic service variable program provides an application service for a user based on the basic service firmware. That is, the first basic service variable program is run in an environment of the basic service firmware to provide the application service for the user.

Step 202 can specifically include sending, to the server, the first request for downloading the software package of the first basic service variable program, and receiving the software package returned by the server according to the first request. That is, after the apparatus sends the first request to the server, the server learns, according to the first request, that the software package of the first basic service variable program needs to be sent. Then, the server sends the software package to the apparatus.

Alternatively, in some other embodiments, step 202 can specifically include sending to the server the second request for downloading the software package of the first basic service variable program, receiving second address information of the software package returned by the server according to the second request, and acquiring the software package according to the second address information.

When receiving the second request, the server learns that the apparatus needs to acquire the software package of the first basic service variable program, and then sends the second address information of the software package to the apparatus. The apparatus downloads the software package according to the second address information.

It should be noted that, the apparatus may perform step 202 after receiving a trigger instruction sent by the user. For example, the user selects the first basic service variable program to be acquired. Alternatively, an instruction sent by the user to trigger step 201 can carry identification information of the first basic service variable program. The apparatus can acquire the software package of the first basic service variable program from the server according to the identification information. Furthermore, the apparatus can also actively perform step 202, so as to download the software package of the first basic service variable program as soon as possible.

In step 203, the apparatus installs the first basic service variable into the first container according to the software package. After the software package is installed into the first container, the first container can provide a service function of the first basic service variable program for the user.

In step 204, the apparatus acquires an upgrade package of the first basic service variable program from the server. After the first basic service variable program is installed into the first container, an upgrade may be required for the first basic service variable program according to actual requirements. In such circumstances, the first basic service variable program may be upgraded in the first container.

Step 204 mentioned above may be achieved by any one of the following manners. In the first manner, step 204 includes receiving first address information of the upgrade package of the first basic service variable program sent by the server, and acquiring the upgrade package according to the first address information.

When acquiring the first address information of the upgrade package of the first basic service variable program, the server actively sends the first address information to the apparatus. When receiving the first address information, the apparatus can download the upgrade package according to the first address information.

It should be noted that, if the server stores the second address information of the first basic service variable program, the first address information may be used to overwrite the second address information.

Specifically, the upgrade package may be stored at any location, for example, in the server or an external memory. More specifically, after the server receives, from the apparatus, the first request for downloading the software package of the first basic service variable program, the server records the identification information of the apparatus. The server sends the first address information to the apparatus, after identifying that the first address information is stored in a preset location in the server or used to overwrite a download address of the original software package. Accordingly, the apparatus can download the upgrade package according to the first address information.

In the second manner, step 204 includes sending, to the server, the acquiring request for downloading the upgrade package of the first basic service variable program, receiving the first address information of the upgrade package returned by the server, and acquiring the upgrade package according to the first address information.

According to the second manner, the apparatus can actively send the acquiring request to the server to acquire the upgrade package of the first basic service variable program. In this way, when receiving the acquiring request, the server sends the first address information to the apparatus according to the acquiring request.

It should be noted that, if the server stores the second address information of the first basic service variable program, the first address information may be used to overwrite the second address information.

Specifically, the upgrade package may be stored at any location, for example, in the server or an external memory. More specifically, after receiving the acquiring request sent by the apparatus, the server identifies whether the first address information exists. In response to an identification that the first address information exists, the server sends the first address information to the apparatus, so that the apparatus downloads the upgrade package according to the first address information.

In the third manner, step 204 includes receiving the upgrade package of the first basic service variable program sent by the server.

After acquiring the upgrade package, the server actively sends the upgrade package to the apparatus.

It should be noted that, if the server stores the software package of the first basic service variable program in advance, the upgrade package may be used to overwrite the software package to save the storage space of the server.

In the fourth manner, step 204 includes sending, to the server, the acquiring request for downloading the upgrade package of the first basic service variable program, and receiving the upgrade package returned by the server according to the acquiring request.

According to the fourth manner, the apparatus can actively send the acquiring request to the server to acquire the upgrade package of the first basic service variable program. In this way, when receiving the acquiring request, the server sends the upgrade package to the apparatus according to the acquiring request.

It should be noted that, if the server stores the software package of the first basic service variable program in advance, the upgrade package may be used to overwrite the software package to save the storage space of the server.

In step 205, the apparatus upgrades the first basic service variable according to the upgrade package.

Step 205 mentioned above may be achieved by any one of the following manners. In the first manner, step 205 includes installing the upgrade package to generate a second basic service variable program, and uninstalling the first basic service variable program.

According to the first manner, the apparatus generates a complete program, that is, the second basic service variable program, in the first container. After successfully installing the second basic service variable program, the apparatus uninstalls the previously installed first basic service variable program, and subsequently uses the second basic service variable program to serve the user. The second basic service variable program has better functions than the first basic service variable program and is an upgraded version of the first basic service variable program. Two basic service variable programs are respectively referred to as "first basic service variable program" and "second basic service variable program" for the purpose of distinguishing one from another. In fact, they can both be referred to as "first basic service variable program", in which one is the original first basic service variable program, and the other one is a first basic service variable program with optimized functions.

In the second manner, step 205 includes installing the upgrade package to optimize a service function of the first basic service variable program.

According to the second manner, the service function of the first basic service variable program is optimized, that is, the first basic service variable program itself is upgraded. This manner does not require uninstalling of the first basic service variable program.

According to some embodiments, the basic service firmware and the basic service variable program are separated, that is, the basic service firmware is set in the image. In this way, the basic service firmware is also generated in the first container when the first container is created. Then, the software package of the basic service variable program is acquired from the server and installed. In this way, the image does not include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced. In addition, when the basic service variable program in the first container is upgraded, only the basic service variable program itself needs to be upgraded, and information created by the user by using the basic service variable program will not be affected. In this way, the container does not need to be down. Accordingly, no other containers replace the container to provide services for the user, and service contents generated by using the container will exist all the time. Moreover, when the apparatus expands the volume of the first container, for example, generating a second container by using the image, a container with larger capacity generated by using the image also includes the latest basic service variable program, since the server includes the latest basic service variable program.

Figure 3:
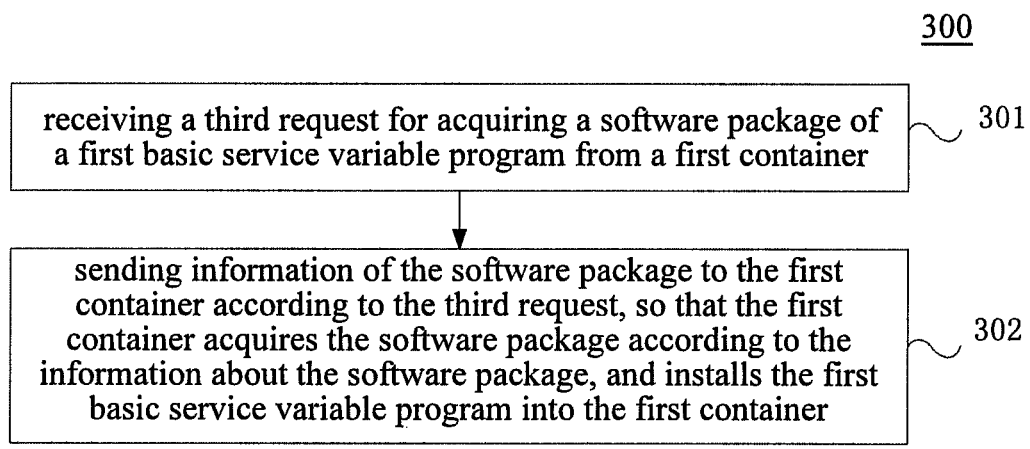
FIG. 3 is a schematic flowchart of an exemplary method for container generation according to still some other embodiments of the present disclosure.

FIG. 3 is a schematic flowchart of a method 300 for generating a first container according to some other embodiments. The embodiments shown in FIG. 3 provide the method 300 for generating the first container. The method 300 is executed by an apparatus for generating a first container. The apparatus for generating a first container may be located in a server. As shown in FIG. 3, the method 300 includes steps 301 and 302.

In step 301, the apparatus receives a third request for acquiring a software package of a first basic service variable program from the first container. The first container is generated according to an image. The image includes a basic service firmware, and the first container can also include a basic service firmware. Then, the first basic service variable program needs to be installed into the first container. In this case, the first container sends the third request for acquiring the software package of the first basic service variable program. The first basic service variable program provides an application service for a user based on the basic service firmware, and the basic service firmware is generated when the first container is generated according to the image.

In step 302, the apparatus sends information of the software package to the first container according to the third request, so that the first container acquires the software package according to the information of the software package, and installs the first basic service variable program into the first container. After receiving the third request, the server sends information of the software package of the first basic service variable program to the first container. The information of the software package of the first basic service variable program may be first address information of the first basic service variable program or may be data information of the software package itself.

Specifically, step 302 may be achieved by any one of the following manners. In the first manner, step 302 includes sending the second address information of the software package to the first container according to the third request, so that the first container acquires the software package according to the second address information. In this step, first, it may be determined whether the software package of the first basic service variable program corresponds to multiple pieces of address information. In response to a determination that the software package of the first basic service variable program corresponds to multiple pieces of address information, latest address information is sent as the second address information to the first container. In this way, the first container acquires the software package of the first basic service variable program according to the second address information, and installs the software package, to use the first basic service variable program of the latest version to provide services for the user.

In the second manner, step 302 includes sending the software package to the first container according to the third request. In this step, the server can first determine, according to the third request, whether the first basic service variable program corresponds to multiple software packages. In response to a determination that the first basic service variable program corresponds to multiple software packages, a latest software package is sent to the first container, so that the first container installs the latest software package, to use the first basic service variable program of the latest version to provide services for the user based on the basic service variable program.

According to the present embodiments, the basic service firmware and the basic service variable program are separated. That is, the basic service firmware is set in the image, so that the basic service firmware is also generated in the first container when the first container is created. Then the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements.

Thus, the time required for generating the first container having the basic service variable program is further reduced.

The method for generating the first container in the embodiments shown in FIG. 3 will be further described in some exemplary embodiments. In the following embodiments, mainly a method for upgrading the first container is described.

In some embodiments, the method for upgrading the first basic service variable program in the first container, after sending the information of the software package to the first container according to the third request, can be achieved by any one of the following manners.

In the first manner, the method includes acquiring first address information of an upgrade package of the first basic service variable program, and sending the first address information to the first container, so that the first container acquires the upgrade package according to the first address information, and upgrades the first basic service variable program according to the upgrade package.

In some embodiments, after acquiring the first address information, the server actively sends the first address information to the first container, so that the first container can be upgraded in time.

In the second manner, the method includes acquiring first address information of an upgrade package of the first basic service variable program, receiving, from the first container, an acquiring request for downloading the upgrade package of the first basic service variable program, and sending the first address information to the first container according to the acquiring request, so that the first container acquires the upgrade package according to the first address information, and upgrades the first basic service variable program according to the upgrade package.

In some embodiments, after acquiring the first address information and after receiving the acquiring request sent by the apparatus, the server sends the first address information to the server. The apparatus can send the acquiring request based on a preset period, or send the acquiring request at a particular time point, for example, at 2 a.m. Thus, the upgrade of the first basic service variable program within a preset time period can be implemented conveniently.

It should be noted that, in the two manners mentioned above, if the server stores the second address information of the software package of the first basic service variable program, the first address information can be used to overwrite the second address information. In this way, the server can directly send the first address information when the server subsequently sends address information of the software package of the first basic service variable program to the first container.

In the third manner, the method includes acquiring an upgrade package of the first basic service variable program, and sending the upgrade package to the first container, so that the first container upgrades the first basic service variable program according to the upgrade package.

In some embodiments, after receiving the upgrade package of the first basic service variable program, the server actively sends the upgrade package to the first container, so that the first container can be upgraded in time.

In the fourth manner, the method includes acquiring an upgrade package of the first basic service variable program, receiving from the first container an acquiring request for downloading the upgrade package of the first basic service variable program, and sending the upgrade package to the first container according to the acquiring request, so that the first container upgrades the first basic service variable program according to the upgrade package.

In some embodiments, the server sends the upgrade package to the server after acquiring the upgrade package and after receiving the acquiring request sent by the apparatus. The apparatus can send the acquiring request based on a preset period, or send the acquiring request at a particular time point, for example, at 2 a.m. Thus, the upgrade of the first basic service variable program within a preset time period can be implemented conveniently.

It should be noted that, in the third manner and the fourth manner, after the acquiring an upgrade package of the first basic service variable program, and before the sending the upgrade package to the first container, the method can further include overwriting the software package of the first basic service variable program with the upgrade package.

In this way, not only the storage space of the server can be saved, but also the judgment operation required due to the existence of software packages of multiple first basic service variable programs can be avoided. Thus, the process is simplified.

According to the embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container is not occupied by the maintenance information. Moreover, the apparatus can select, for the first container, the basic service variable program to be downloaded, so that the first container can be customized according to actual requirements. Thus, the time required for generating the first container having the basic service variable program is further reduced. In addition, when upgrading the basic service variable program in the first container, the basic service variable program itself is upgraded, and information created by the user by using the basic service variable program will not be affected.

Figure 4:
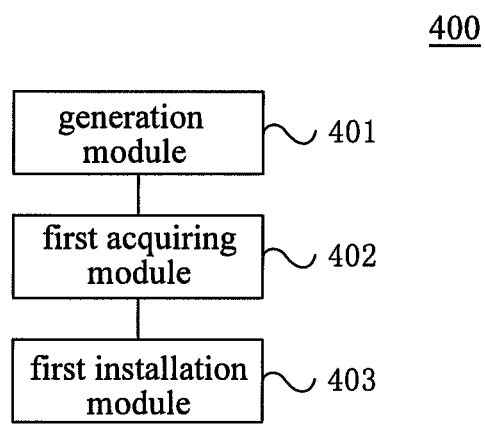
FIG. 4 is a schematic structural diagram of an exemplary apparatus for container generation according to some embodiments of the present disclosure.

FIG. 4 is a schematic structural diagram of an apparatus 400 for container generation according to some embodiments. The embodiments shown in FIG. 4 provide the apparatus 400 for container generation configured to perform the method for container generation in the embodiments of FIG. 1. The apparatus 400 may be disposed in a first container (e.g., the first container 1102) described below.

As shown in FIG. 4, the apparatus 400 for container generation includes a generation module 401, a first acquiring module 402, and a first installation module 403.

The generation module 401 is configured to generate the first container according to an image. The image and the first container both include a basic service firmware. The first acquiring module 402 is configured to acquire a software package of a first basic service variable program from a server. The first basic service variable program provides an application service for a user based on the basic service firmware. The first installation module 403 is configured to install the first basic service variable program into the first container according to the software package.

Optionally, the first acquiring module 402 is specifically configured to send, to the server, the first request for downloading the software package of the first basic service variable program, and receive the software package returned by the server according to the first request.

Alternatively, and optionally, the first acquiring module 402 is specifically configured to send, to the server, the second request for downloading the software package of the first basic service variable program, receive the second address information of the software package returned by the server according to the second request, and acquire the software package according to the second address information.

As for the apparatus 400 in the present embodiments, specific manners in which the modules execute corresponding operations have been described in detail in the related method embodiments, and the details will not be repeated here.

According to the present embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced.

Figure 5:
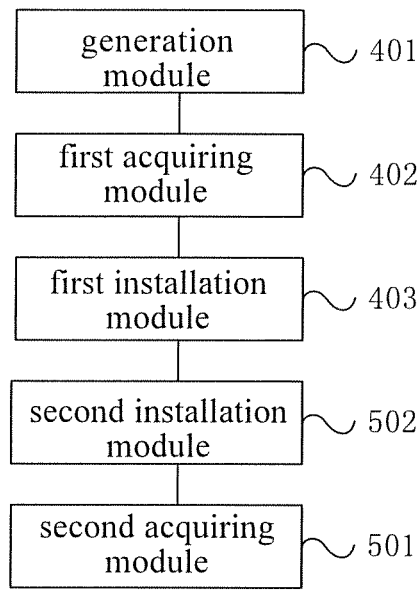
FIG. 5 is a schematic structural diagram of an exemplary apparatus for container generation according to some other embodiments of the present disclosure.

FIG. 5 is a schematic structural diagram of an apparatus 500 for container generation according to some embodiments. The embodiments shown in FIG. 5 further describes an exemplary modification of the apparatus 400 in FIG. 4.

In the embodiments of FIG. 5, the apparatus 500 not only includes the generation module 401, the first acquiring module 402, and the first installation module 403 shown in FIG. 4, but also includes a second acquiring module 501 and a second installation module 502.

The second acquiring module 501 is configured to acquire the upgrade package of the first basic service variable program from the server. The second installation module 502 is configured to upgrade the first basic service variable program according to the upgrade package.

Optionally, the second acquiring module 501 may be specifically configured to acquire the upgrade package in any one of the following manners.

In the first manner, the second acquiring module 501 is configured to receive first address information of the upgrade package of the first basic service variable program sent by the server, and acquire the upgrade package according to the first address information.

In the second manner, the second acquiring module 501 is configured to send, to the server, the acquiring request for downloading the upgrade package of the first basic service variable program. The second acquiring module 501 is further configured to receive the first address information of the upgrade package returned by the server, and acquire the upgrade package according to the first address information.

In the third manner, the second acquiring module 501 is configured to receive the upgrade package of the first basic service variable program sent by the server.

In the fourth manner, the second acquiring module 501 is configured to send, to the server, the acquiring request for downloading the upgrade package of the first basic service variable program and receive the upgrade package returned by the server according to the acquiring request.

Optionally, the second installation module 502 is configured to upgrade the first basic service variable program in any one of the following manners.

In the first manner, the second installation module 502 is configured to install the upgrade package to generate a second basic service variable program, and uninstall the first basic service variable program.

In the second manner, the second installation module 502 is configured to install the upgrade package to optimize a service function of the first basic service variable program.

As for the apparatus in the various embodiments, specific manners in which the modules execute corresponding operations have been described in detail in the related method embodiments, and the details will not be repeated here.

According to the embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced. In addition, when upgrading the basic service variable program in the first container, the basic service variable program itself is upgraded, and information created by the user by using the basic service variable program will not be affected. In this way, the container does not need to be down. Accordingly, no other containers will replace the container to provide services for the user, and service contents generated by using the container will exist all the time.

Figure 6:
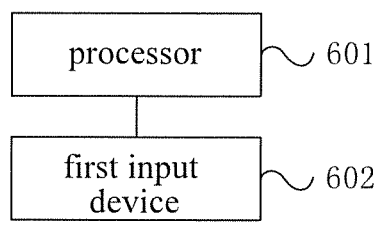
FIG. 6 is a schematic structural diagram of an exemplary apparatus for container generation according to still some other embodiments of the present disclosure.

FIG. 6 is a schematic structural diagram of an apparatus 600 according to some embodiments. The embodiments shown in FIG. 6 provide the apparatus 600 for container generation. The apparatus 600 is configured to perform the methods 100 or 200 for container generation depicted in FIG. 1 or FIG. 2 and the apparatus 600 can be disposed in a first container (e.g., the first container 1102).

The apparatus 600 includes a processor 601 and a first input device 602. The processor 601 is configured to generate a first container according to an image. The image and the first container both include a basic service firmware. The first input device 602 is configured to acquire a software package of a first basic service variable program from a server. The first basic service variable program provides an application service for a user based on the basic service firmware. In some embodiments, the processor 601 is further configured to install the first basic service variable program into the first container according to the software package.

Optionally, the first input device 602 is further configured to acquire the upgrade package of the first basic service variable program from the server. The processor 601 is further configured to upgrade the first basic service variable program according to the upgrade package.

Optionally, the processor 601 may be implemented by, for example, a Central Processing Unit (CPU), an application-specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements. The processor 601 is coupled to the first input device 602 through wired or wireless connection.

Optionally, the first input device 602 may include various input devices, for example, may include at least one of a user-oriented user interface, a device-oriented device interface, a software programmable interface, and a transceiver. Optionally, the device-oriented device interface may be a cable interface configured to perform data transmission between devices or may be a hardware insertion interface configured to perform data transmission between devices (e.g., a USB interface or a serial interface). Optionally, the user-oriented user interface may be, for example, a user-oriented control key, a voice input device configured to receive a voice input, or a touch-sensitive device configured to receive a user's touch input (e.g., a touchscreen or touch pad having a touch-sensitive function). Optionally, the programmable interface of the software mentioned above may be, for example, an entry for the user to edit or modify the program, such as an input pin interface or input interface of a chip. Optionally, the transceiver may be a radio frequency transceiver chip, a baseband processor chip, or a transceiver antenna having a communication function.

As for the apparatus in the embodiments, specific manners in which the processor 601 and the first input device 602 execute corresponding operations have been described in detail in the related method embodiments, and the details will not be repeated here.

According to the embodiment, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced.

Figure 7:
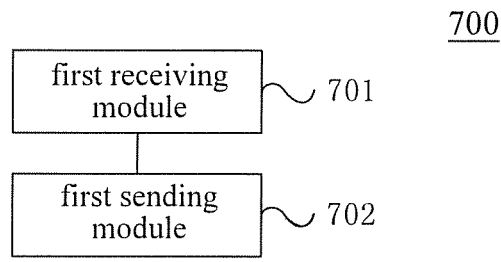
FIG. 7 is a schematic structural diagram of an exemplary apparatus for container generation according to yet some other embodiments of the present disclosure.

FIG. 7 is a schematic structural diagram of an apparatus 700 for container generation according to some embodiments. The embodiments shown in FIG. 7 provide the apparatus 700 for container generation. The apparatus 700 is configured to perform the method for container generation depicted in FIG. 3, and may be disposed in a server (e.g., the server 1103).

The apparatus 700 includes a first receiving module 701 and a first sending module 702. The first receiving module 701 is configured to receive a third request, which is sent from a first container, for acquiring a software package of a first basic service variable program. The first sending module 702 is configured to send information of the software package to the first container according to the third request. Accordingly, the first container acquires the software package according to the information of the software package, and installs the first basic service variable program into the first container. The first basic service variable program provides an application service for a user based on the basic service firmware, and the basic service firmware is generated when the first container is generated according to the image.

Optionally, the first sending module 702 is specifically configured to send the second address information of the software package to the first container according to the third request. Accordingly, the first container acquires the software package according to the second address information.

More specifically, in some embodiments, the first sending module 702 is specifically configured to determine, according to the third request, whether the first basic service variable program corresponds to multiple pieces of address information. The first sending module 702 is further configured to, responsive to a result of the determination being true, send latest address information as the second address information to the first container.

Alternatively, optionally, the first sending module 702 is specifically configured to send the software package to the first container according to the third request. More specifically, in some other embodiments, the first sending module 702 is specifically configured to determine, according to the third request, whether the first basic service variable program corresponds to multiple software packages. The first sending module 702 is further configured to, responsive to a result of the determination being true, send a latest software package to the first container.

As for the apparatus in the embodiments, specific manners in which the modules execute corresponding operations have been described in detail in the related method embodiments, and the details will not be repeated here.

According to the embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus the time required for generating the first container having the basic service variable program is further reduced.

Figure 8:
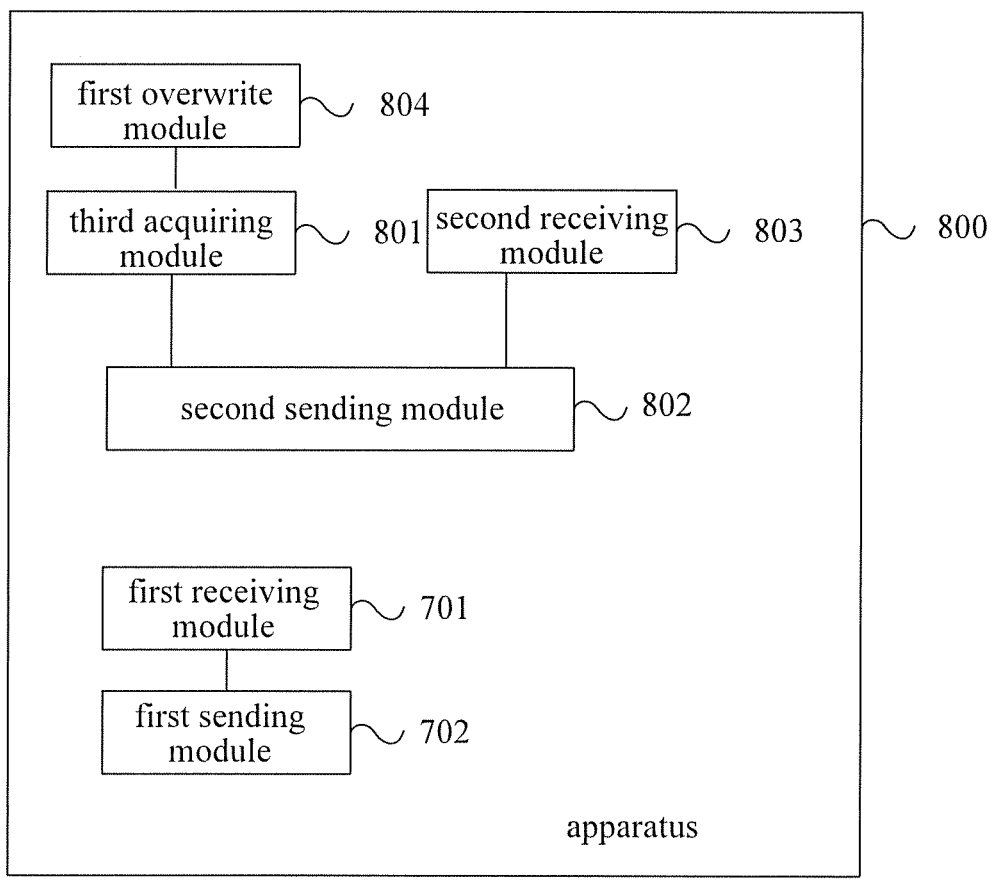
FIG. 8 is a schematic structural diagram of an exemplary apparatus for container generation according to some other embodiments of the present disclosure.

FIG. 8 is a schematic structural diagram of an apparatus 800 for container generation according to some embodiments. The embodiments shown in FIG. 8 further describe an exemplary modification of the apparatus 700 for container generation depicted in FIG. 7.

The apparatus 800 not only includes the first receiving module 701 and the first sending module 702 shown in FIG. 7, but also includes a third acquiring module 801 and a second sending module 802.

The third acquiring module 801 is configured to acquire first address information of an upgrade package of the first basic service variable program. The second sending module 802 is configured to send the first address information to the first container. Accordingly, the first container acquires the upgrade package according to the first address information and upgrades the first basic service variable program according to the upgrade package.

Optionally, the apparatus 800 may further include a second receiving module 803. The second receiving module 803 is configured to receive, from the first container, an acquiring request for downloading the upgrade package of the first basic service variable program. Correspondingly, the second sending module 802 is specifically configured to send the first address information to the first container according to the acquiring request.

Optionally, the apparatus 800 of the embodiments further includes a first overwrite module 804. The first overwrite module 804 is configured to overwrite second address information with the first address information. The second address information is address information of the software package of the first basic service variable program.

As for the apparatus 800 in the embodiments, specific manners in which the modules execute corresponding operations have been described in detail in the related method embodiments, and the details will not be repeated here.

According to the embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements, thus the time required for generating the first container having the basic service variable program is further reduced. In addition, when upgrading the basic service variable program in the first container, the basic service variable program itself is upgraded, and information created by the user by using the basic service variable program will not be affected. In this way, the container does not need to be down. That is, no other containers will replace the container to provide services for the user, and service contents generated by using the container will exist all the time.

Figure 9:
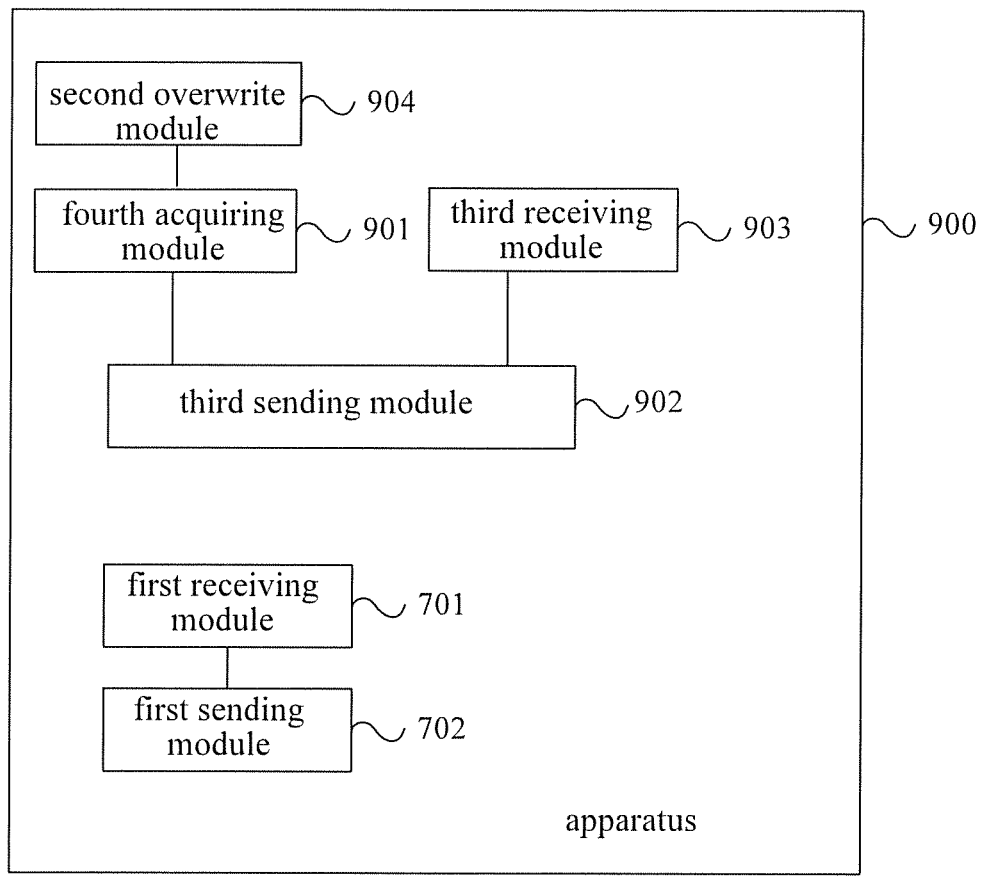
FIG. 9 is a schematic structural diagram of an exemplary apparatus for container generation according to still some other embodiments of the present disclosure.

FIG. 9 is a schematic structural diagram of an apparatus 900 for container generation according to some embodiments. The embodiments shown in FIG. 9 further describes an exemplary modification of the apparatus 700 for the container generation depicted in FIG. 7.

The apparatus 900 not only includes the first receiving module 701 and the first sending module 702 shown in FIG. 7, but also includes a fourth acquiring module 901 and a third sending module 902.

The fourth acquiring module 901 is configured to acquire an upgrade package of the first basic service variable program. The third sending module 902 is configured to send the upgrade package to the first container, so that the first container upgrades the first basic service variable program according to the upgrade package.

Optionally, the apparatus 900 of the embodiments further includes a third receiving module 903. The third receiving module 903 is configured to receive, from the first container, an acquiring request for downloading the upgrade package of the first basic service variable program. Correspondingly, the third sending module 902 is specifically configured to send the upgrade package to the first container according to the acquiring request.

Optionally, the apparatus 900 of the embodiments further includes a second overwrite module 904. The second overwrite module 904 is configured to overwrite the software package of the first basic service variable program with the upgrade package.

As for the apparatus 900 in the embodiments, specific manners in which the modules execute corresponding operations have been described in detail in the related method embodiments, and the details will not be repeated here.

According to the embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced. In addition, when upgrading the basic service variable program in the first container, the basic service variable program itself is upgraded, and information created by the user by using the basic service variable program will not be affected. In this way, the container does not need to be down. That is, no other containers will replace the container to provide services for the user, and service contents generated by using the container will exist all the time.

Figure 10:
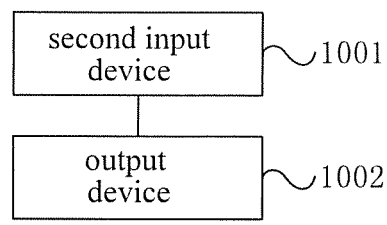
FIG. 10 is a schematic structural diagram of an exemplary apparatus for container generation according to yet some other embodiments of the present disclosure.

FIG. 10 is a schematic structural diagram of an apparatus 1000 for container generation according to some embodiments. The embodiments shown in FIG. 10 provide the apparatus 1000 for container generation, which is configured to perform the methods 300 for container generation in FIG. 3. The apparatus 1000 may be disposed in a server (e.g., the server 1103).

As shown in FIG. 10, the apparatus 1000 includes a second input device 1001 and an output device 1002. The second input device 1001 is configured to receive, from a first container, a third request for acquiring a software package of a first basic service variable program. The output device 1002 is configured to send information of the software package to the first container according to the third request. Accordingly, the first container acquires the software package according to the information of the software package, and installs the first basic service variable program into the first container. The first basic service variable program provides an application service for a user based on the basic service firmware. The basic service firmware is generated when the first container is generated according to the image.

Optionally, in some embodiments, the second input device 1001 is further configured to acquire first address information of an upgrade package of the first basic service variable program. The output device 1002 is further configured to send the first address information to the first container. Accordingly, the first container acquires the upgrade package according to the first address information and upgrades the first basic service variable program according to the upgrade package.

As for the apparatus in the present embodiments, specific manners in which the second input device 1001 and the output device 1002 execute corresponding operations have been described in detail in the related method embodiments, and the details will not be repeated here.

According to the present embodiments, the basic service firmware and the basic service variable program are separated. That is, the basic service firmware is set in the image, so that the basic service firmware is also generated in the first container when the first container is created. Then, the software package of the basic service variable program is acquired from the server and installed. In this way, the image does not have to include maintenance information required for maintaining the basic service firmware and the basic service variable program. Therefore, the first container capable of providing the application service can be generated very rapidly, and the space of the first container will not be occupied by the maintenance information. Moreover, the apparatus can select, for the first container, the basic service variable program to be downloaded, so that the first container can be customized according to actual requirements. Thus, the time required for generating the first container having the basic service variable program is further reduced.

Referring to FIG. 11 again. The system 1100 for container generation of the embodiments includes any one of the apparatus 400, 500, 600, 700, 800, 900, or 1000 for container generation according to any one of the foregoing embodiments and the image 1101. That is, the system 1100 includes the container and the server that includes the apparatus for container generation according to any one of the foregoing embodiments. The system 1100 for container generation of the embodiments will be described in detail through following specific examples.

In some embodiments, the image 1101 is set in the terminal 1110, and an acquisition application may be further set. The acquisition application can be, for example, an entry point module 11011.

The terminal 1110 of the embodiments may receive an upgrade package of a first basic service variable program sent by the server. In this way, the terminal 1110 can install the upgrade package to generate a second basic service variable program and uninstall the first basic service variable program. Alternatively, the terminal 1110 can install the upgrade package to optimize a service function of the first basic service variable program.

First, the terminal 1110 generates the first container 1102 according to the image 1101. The image 1101 includes a basic service firmware. Therefore, the first container 1102 also includes the basic service firmware, and an entry point module 11021 is also generated therein. The entry point module 11021 specifically executes subsequent operations of acquiring and installing the software package of the first basic service variable program for the first container 1102. As the entry point module 11021 is set in the first container 1102, the operations performed by the entry point module 11021 are also operations performed by the first container 1102.

Next, the first container 1102 sends, to the server 1103, an acquiring request for acquiring a software package of the first basic service variable program. After receiving the acquiring request, the server 1103 records an identifier of the first container 1102 and sends second address information of the software package of the first basic service variable program to the first container 1102. After receiving the second address information, the first container 1102 downloads the first basic service variable program according to the second address information, and installs the first basic service variable program 11022, to use the first basic service variable program 11022 to provide the service function for the user based on the basic service firmware in the first container 1102.

After a period of time, the server 1103 receives first address information of the upgrade package of the first basic service variable program, and then is able to look up a preset record to determine containers that have installed the first basic service variable program. When identifying that the first container 1102 has installed the first basic service variable program, the server 1103 may actively send the first address information to the first container 1102. After receiving the first address information, the first container 1102 downloads and installs the upgrade package, to generate a second basic service variable program, which is a first basic service variable program having optimized functions. Then, the first container 1102 uninstalls the first basic service variable program, and uses the second basic service variable program to provide the service function for the user based on the basic service firmware in the first container 1102.

Moreover, in some embodiments, after receiving the first address information, the first container 1102 overwrites second address information with the first address information.

Next, a second container 1104 may be created according to actual requirements. The second container has a larger capacity than the first container 1102. Specifically, the second container 1104 is generated according to the image 1101. It is understood how to specifically create the second container 1104 according to the image 1101, and thus further explanation will not be described in detail herein. The second container 1104 includes the basic service firmware, and an entry point module 11041 is also generated therein.

Next, the second container 1104 acquires the software package of the first basic service variable program from the server 1103. The server 1103 stores the first address information of the first basic service variable program of the latest version. Accordingly, the second container 1104, after downloading and installing the software package of the first basic service variable program, can use the first basic service variable program 11042 of the latest version to provide the service function for the user. In this way, it can be avoided that a newly generated first container has to upgrade the installed basic service variable when the basic service variable program is included in the image. Thus, operation steps are reduced.

The present disclosure further provides a terminal (e.g., the terminal 1110), including any one of the apparatuses 400, 500, or 600 for container generation according to any one of embodiments shown in FIG. 4 to FIG. 6.

The present disclosure further provides a server (e.g., the server 1103), including any one of the apparatuses 700, 800, 900, or 1000 for container generation according to any one of embodiments shown in FIG. 7 to FIG. 10.

The foregoing embodiments are merely used to illustrate the technical solutions provided by the present disclosure and are not intended to limit the present disclosure. Although the present disclosure has been described in detail with reference to the foregoing embodiments, persons of ordinary skill in the art should understand that they can still make various changes and modifications to the technical solutions set forth in the foregoing embodiments or make equivalent replacements to some or all of the technical features. As long as such modifications or replacements consistent with the technical solutions of the embodiments in the present disclosure, the modifications or replacements shall fall within the protection scope of the present disclosure.

The present disclosure may be described in a general context of computer-executable commands or operations, such as a program module, stored on a computer-readable medium and executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

Embodiments of the present disclosure may be embodied as a method, an apparatus, a device, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above.

Furthermore, embodiments of the present disclosure may take the form of a computer program product embodied in one or more computer-readable medium that may be used for storing computer-readable program codes. Based on such an understanding, the technical solutions of the present disclosure can be implemented in a form of a software product. The software product can be stored in a non-volatile storage medium (which can be a CD-ROM, a USB flash memory, a mobile hard disk, and the like). The storage medium can include a set of instructions for instructing a computer device (which may be a personal computer, a server, a network device, a mobile device, or the like) or a processor to perform a part of the steps of the methods provided in the embodiments of the present disclosure. The foregoing storage medium may include, for example, any medium that can store a program code, such as a USB flash disk, a removable hard disk, a Read-Only Memory (ROM), a Random-Access Memory (RAM), a magnetic disk, or an optical disc. The storage medium can be a non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

Various functional components or blocks have been described herein. As will be appreciated by persons skilled in the art, the functional blocks may be implemented through circuits (either dedicated circuits, or general purpose circuits, which operate under the control of one or more processors and coded instructions), which will typically include transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

In general, the word "module," as used in this document, can be a packaged functional hardware unit designed for use with other components (e.g., portions of an integrated circuit) or a part of a program (stored on a computer-readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer-readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules but can be represented in hardware or firmware. Generally, the modules described herein refer to logical modules that can be combined with other modules or divided into sub-modules despite their physical organization or storage.

It should also be noted that, the relational terms such as "first" and "second" are only used to distinguish an entity or operation from another entity or operation and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items. The term "if" may be construed as "at the time of," "when," "in response to," or "in response to determining."

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for container generation, comprising:
generating a first container according to an image, wherein the first container is a lightweight virtual machine, and the image and the first container both comprise a service firmware;
acquiring a software package of a first service variable program from a server; and
installing the first service variable program into the first container according to the software package, wherein the first service variable program is configured to provide an application service for a user based on the service firmware.

2. The method of claim 1, wherein after installing the first service variable program into the first container according to the software package, the method further comprises:
acquiring an upgrade package of the first service variable program from the server; and
upgrading the first service variable program according to the upgrade package.

3. The method of claim 2, wherein acquiring the upgrade package of the first service variable program from the server comprises:
receiving first address information of the upgrade package of the first service variable program sent by the server; and
acquiring the upgrade package according to the first address information.

4. The method of claim 2, wherein acquiring the upgrade package of the first service variable program from the server comprises:
sending an acquiring request for downloading the upgrade package of the first service variable program to the server;
receiving the first address information of the upgrade package returned by the server; and
acquiring the upgrade package according to the first address information.

5. The method of claim 2, wherein acquiring the upgrade package of the first service variable program from the server comprises:
receiving the upgrade package of the first service variable program sent by the server.

6. The method of claim 2, wherein acquiring the upgrade package of the first service variable program from the server comprises:
sending an acquiring request for downloading the upgrade package of the first service variable program to the server; and
receiving the upgrade package returned by the server according to the acquiring request.

7. The method of claim 2, wherein upgrading the first service variable program according to the upgrade package comprises:
installing the upgrade package to generate a second service variable program; and
uninstalling the first service variable program.

8. The method of claim 2, wherein upgrading the first service variable program according to the upgrade package comprises:
installing the upgrade package to optimize a service function of the first service variable program.

9. The method of claim 1, wherein acquiring the software package of the first service variable program from the server comprises:
sending a first request for downloading the software package of the first service variable program to the server; and
receiving the software package returned by the server according to the first request.

10. The method of claim 1, wherein acquiring the software package of the first service variable program from the server comprises:
sending a second request for downloading the software package of the first service variable program to the server;
receiving second address information of the software package returned by the server according to the second request; and
acquiring the software package according to the second address information.

11. An apparatus for container generation, comprising:
a memory storing a set of instructions; and
a processor configured to execute the set of instructions to cause the apparatus to perform:
generating a first container according to an image, wherein the first container is a lightweight virtual machine, and the image and the first container both comprise a service firmware;
acquiring a software package of a first service variable program from a server, wherein the first service variable program is configured to provide an application service for a user based on the service firmware; and
installing the first service variable program into the first container according to the software package.

12. A non-transitory computer-readable medium that stores a set of instructions that is executable by at least one processor of an apparatus to cause the apparatus to perform a method for container generation, the method comprising:
generating a first container according to an image, wherein the first container is a lightweight virtual machine, and the image and the first container both comprise a service firmware; and
acquiring a software package of a first service variable program from a server, and installing the first service variable program into the first container according to the software package, wherein the first service variable program is configured to provide an application service for a user based on the service firmware.

13. The non-transitory computer-readable medium of claim 12, wherein after installing the first service variable program into the first container according to the software package, the set of instructions that is executable by the at least one processor of the apparatus causes the apparatus to further perform:

acquiring an upgrade package of the first service variable program from the server; and upgrading the first service variable program according to the upgrade package.

14. The non-transitory computer-readable medium of claim 13, wherein acquiring the upgrade package of the first service variable program from the server comprises:

receiving first address information of the upgrade package of the first service variable program sent by the server; and acquiring the upgrade package according to the first address information.

15. The non-transitory computer-readable medium of claim 13, wherein acquiring the upgrade package of the first service variable program from the server comprises:

sending an acquiring request for downloading the upgrade package of the first service variable program to the server;

receiving the first address information of the upgrade package returned by the server; and acquiring the upgrade package according to the first address information.

16. The non-transitory computer-readable medium of claim 13, wherein acquiring the upgrade package of the first service variable program from the server comprises:

receiving the upgrade package of the first service variable program sent by the server.

17. The non-transitory computer-readable medium of claim 13, wherein acquiring the upgrade package of the first service variable program from the server comprises:

sending an acquiring request for downloading the upgrade package of the first service variable program to the server; and receiving the upgrade package returned by the server according to the acquiring request.

18. The non-transitory computer-readable medium of claim 13, wherein upgrading the first service variable program according to the upgrade package comprises:

installing the upgrade package to generate a second service variable program; and uninstalling the first service variable program.

19. The non-transitory computer-readable medium of claim 12, wherein acquiring the software package of the first service variable program from the server comprises:

sending a first request for downloading the software package of the first service variable program to the server; and receiving the software package returned by the server according to the first request.

20. The non-transitory computer-readable medium of claim 12, wherein acquiring the software package of the first service variable program from the server comprises:

sending a second request for downloading the software package of the first service variable program to the server;

receiving second address information of the software package returned by the server according to the second request; and acquiring the software package according to the second address information.

* * * * *